F. S. VOSS.
BELT FASTENER.
APPLICATION FILED FEB. 25, 1914.
1,246,194.
Patented Nov. 13, 1917.
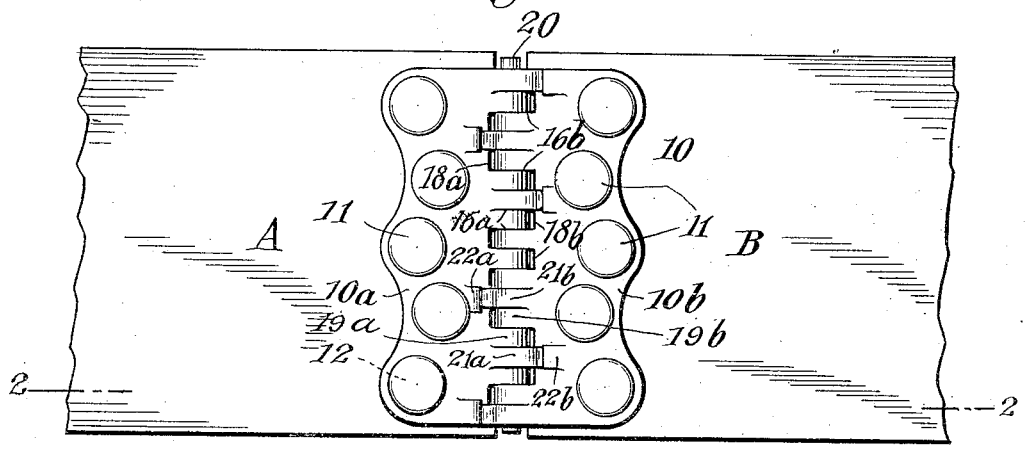
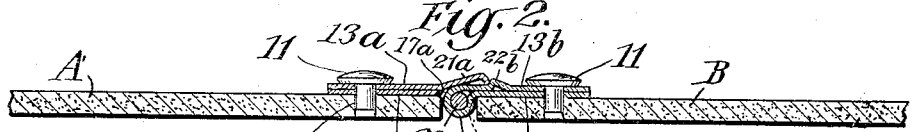
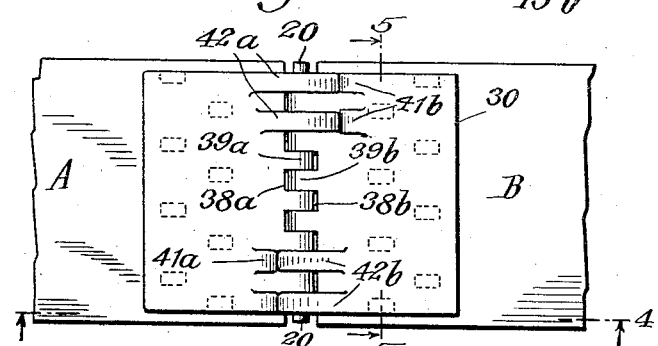
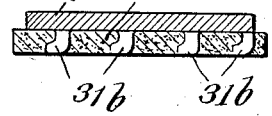
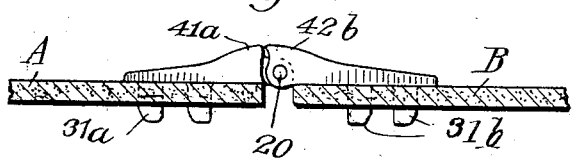
WITNESSES
INVENTOR
F. S. Voss
BY
ATTORNEY

UNITED STATES PATENT OFFICE.

FRANK S. VOSS, OF NEW YORK, N. Y.

BELT-FASTENER.

1,246,194.  Specification of Letters Patent.  Patented Nov. 13, 1917.

Application filed February 25, 1914. Serial No. 820,830.

*To all whom it may concern:*

Be it known that I, FRANK S. VOSS, a citizen of the United States, and a resident of the borough of Manhattan, city and State of New York, have invented certain new and useful Improvements in Belt-Fasteners, of which the following is a specification.

This invention relates to belt fasteners of that class in which a metal plate is placed across the abutting ends of a belt, the plate being secured to the ends of the belt by suitable fastening means, and it relates more specifically to a plate made in two parts and secured together by a pivotal joint.

One of the objects of the invention is to produce a plate in two parts and to connect the parts together by a pin which will permit the parts to be readily connected or separated. Another object is to provide the two parts of the plate with stops which will limit the movement of the plate in one direction so that when the belt sags, the proper strain will be transmitted to the rivets securing the plate to the belt so that the rivets will not be pulled out. Another object is to provide a fastener with integral fastening means projecting from a surface of the plate to be used to secure the same to the belt.

Other objects will appear from the hereinafter description.

The invention will be fully understood from the said description taken in connection with the accompanying drawing which illustrates certain embodiments of the invention on which the same reference character indicates the same part in the several views.

Referring to the drawing:

Figure 1 is a top plan view of the fastener shown attached to the abutting ends of a belt.

Fig. 2 is a cross section on line 2 of Fig. 1.

Fig. 3 is a top plan view of a modification showing the fastener connected to the abutting ends of a belt.

Fig. 4 is a cross section on line 4 of Fig. 3, showing the fastening fingers unclenched.

Fig. 5 is a cross section on line 5 of Fig. 3.

The part marked A represents one end of the belt and B the other end.

Referring specifically to Figs. 1 and 2, 10 is a plate which is formed of two parts 10$^a$ and 10$^b$, which are secured to the belt by rivets 11, passing through holes 12 in the plates and clenched on the under side of the belt. Each section of the plate is formed of a sheet of metal folded upon itself forming the members 13$^a$, 14$^a$ and 13$^b$ and 14$^b$, respectively. In folding the sheet each inner edge is formed into an eye 15$^a$ or 15$^b$. Each edge is slotted longitudinally at 16$^a$ or 16$^b$, respectively, and the under fold 14$^a$ or 14$^b$ is cut transversely at 17$^a$ and the end cut off. Each of the parts 21$^a$ or 21$^b$ left is turned up to leave the alternate recesses 18$^a$ and 18$^b$, with a series of alternate eye sections 19$^a$ and 19$^b$ between. The eye sections or eyes project into the recesses and a pin 20 extends through the eyes to pivot the two sections of the plate together. The parts 21$^a$ and 21$^b$ project over the eyes 19$^a$ and 19$^b$ respectively. The upper fold 13$^a$ and 13$^b$ and each section of the plate is stamped upwardly adjacent the free ends of the parts or fingers 21$^a$ and 21$^b$ to form lugs 22$^a$ and 22$^b$ against which the fingers contact when the ends of the sections are raised.

By forming the plate in two sections and pivoting the sections together, the strain on the plate and rivets by which the plate is fastened to the belt is lessened as the belt passes over the pulley and there is therefore less liability of the rivets being pulled out of the belt in going around a pulley. By providing the pivoted sections with stops, the two sections will be held in substantially straight line when the belt sags between pulleys. The strain on the rivets is therefore in substantially a straight line and the liability of the rivets being strained or pulled out when the belt sags is also lessened, if not prevented.

In Figs. 3 and 4 I have shown a modified construction in which the two sections of the plate 30 are made of cast metal, one face of each section being provided with lugs or fingers 31$^a$ and 31$^b$ integrally with the sections and by which the sections are secured to the belt. The meeting edge of each section is provided with a series of alternate recesses 38$^a$ and 38$^b$ and alternate eyes 39$^a$ and 39$^b$ which project into the recesses. The pin 20 extends through the eyes transversely of the sections and pivotally secure the sections together. The upper surface of each section is provided with lugs 41$^a$ and 41$^b$ and 42$^a$ and 42$^b$ respectively which act as stops to limit the upward movement of the section to keep the said sections in substantially straight lines when the belt sags between pulleys.

What I claim as new and desire to secure by Letters Patent, is:—

1. In a belt fastener, a plate formed in duplicate sections, means to secure each section to an end of the belt, each adjacent end of a section of the plate provided with alternate recesses and alternate eyes, the eyes fitting in the recesses, a pin passing through the eyes to pivotedly connect the sections, similarly arranged projections and fingers on the respective sections, said fingers engaging the projections to limit the movement of the sections in one direction.

2. In a belt fastener, a plate formed in two sections, each section being formed of sheet metal doubled and folded upon itself so that the adjacent ends of the sections will be provided with eyes, the said eyes being cut away to form alternate recesses and projections, the projections extending into the recesses, a pin passing through the eyes, the upper surface of each section being stamped upwardly to form respectively abutting lugs and fingers, the fingers being formed of material stamped up from the plate adjacent the eyes but independent thereof.

In witness whereof I have hereunto set my hand at the borough of Manhattan, city and State of New York, this 17th day of February, 1914.

FRANK S. VOSS.

In presence of—
  E. D. BARON,
  I. R. RICHARDS.

Copies of this patent may be obtained for five cents each, by addressing the "Commissioner of Patents, Washington, D. C."